(12) United States Patent
Vakil et al.

(10) Patent No.: US 7,042,170 B2
(45) Date of Patent: May 9, 2006

(54) DIGITAL BALLAST

(75) Inventors: Usman Vakil, Walnut, CA (US); Chingez Tarar, Anaheim Hills, CA (US)

(73) Assignee: Lights of America, Inc., Walnut, CA (US)

( * ) Notice: Subject to any disclaimer, the term of this patent is extended or adjusted under 35 U.S.C. 154(b) by 0 days.

(21) Appl. No.: 10/680,792

(22) Filed: Oct. 7, 2003

(65) Prior Publication Data

US 2004/0239263 A1    Dec. 2, 2004

Related U.S. Application Data

(60) Provisional application No. 60/474,901, filed on May 31, 2003.

(51) Int. Cl.
*H05B 37/00* (2006.01)

(52) U.S. Cl. ...................... 315/291; 315/224

(58) Field of Classification Search ............... 315/224, 315/225, 291, 308, 307, 244, 209 R, 219, 315/247

See application file for complete search history.

(56) References Cited

U.S. PATENT DOCUMENTS

| | | | | | |
|---|---|---|---|---|---|
| 4,415,839 | A | * | 11/1983 | Lesea | 315/308 |
| 5,910,709 | A | * | 6/1999 | Stevanovic et al. | 315/225 |
| 5,910,712 | A | * | 6/1999 | Toyama | 315/307 |
| 6,181,086 | B1 | * | 1/2001 | Katyl et al. | 315/307 |
| 6,667,585 | B1 | * | 12/2003 | O'Meara | 315/291 |

* cited by examiner

*Primary Examiner*—Wilson Lee
(74) *Attorney, Agent, or Firm*—Bergman Kuta LLP

(57) ABSTRACT

A ballast in which the drive current frequency is controlled by a voltage-controlled oscillator (VCO) that is capable of precise output frequency control. The VCO frequency is controlled by a microcontroller. The microcontroller may control the VCO frequency in response to various input signals including a triac signal, a manual dimmer control signal, a remote control receiver signal, a light monitor signal, a motion detector signal, or a communication interface signal.

27 Claims, 12 Drawing Sheets

US 7,042,170 B2

DIGITAL BALLAST

RELATED APPLICATIONS

This application claims priority from U.S. Provisional application 60/474,901 filed 31 May 2003.

BACKGROUND OF THE INVENTION

1. Field of the Invention

Embodiments of the invention relate to ballast circuits for powering gas discharge lamps such as fluorescent lamps.

2. Related Technology

Gas discharge lamps such as fluorescent lamps are driven by alternating current (AC) drive signals. The circuits used to produce the drive signals are typically referred to as ballasts. Conventional ballasts are typically analog resonators that convert a DC voltage to an AC voltage having an appropriate frequency for driving a lamp.

FIG. 1 shows a first example of a conventional analog ballast. In this circuit, an AC line voltage is converted to DC in a rectifier 10, which provides rail and ground voltages for the ballast circuit. A drive signal for driving a gas discharge lamp 12 is generated by an analog drive circuit 14 that controls the voltage at a control node 16 to which the gates of complementary MOSFETs 18, 20 are coupled. The frequency produced by the analog drive circuit 14 is a function of resonant elements within the drive circuit, resonant elements in the discharge lamp 12, an inductor coupled between the common node 24 of the switches 18, 20, and a control inductor 26 provided between the drive circuit 14 and the control node 16. To provide dimming, the control inductor 26 is mutually coupled to an inductor provided within a control circuit 28. The control circuit 28 receives a lamp current feedback signal from a current sensor 30 that is proportional to the lamp current, and receives a control signal from a user control device such as a potentiometer. Based on a comparison of the lamp current signal and the control signal, the control circuit 28 controls the voltage across its inductor, which changes the load across the control inductor 26, causing an increase or decrease of the drive signal frequency and thus changing the current delivered to the lamp. Because this type of circuit provides dimming using a control signal that is separate from the line power, it is referred to as a "three-wire" type of dimming ballast.

An example of a "two-wire" type analog dimming ballast is provided in FIG. 2. This circuit is similar to that of FIG. 1, except that the control signal provided to the control circuit 28 is taken from the rail output of the rectifier 10. This type of circuit is typically used where power is supplied by a triac, which is conventionally used to provide dimming of incandescent lights by controlling the power supplied to the light. In the ballast of FIG. 2, the control circuit 28 controls the frequency of the drive signal in response to the power supplied by the triac.

Recent development efforts in fluorescent lighting have focused on reducing the size of ballasts so that, for example, a ballast and a fluorescent tube may be combined in a package that is compatible with conventional incandescent light sockets and fixtures. For such packaging, it is desirable that the size, weight and power consumption of ballasts are reduced as much as possible. Analog ballasts of the type shown in FIGS. 1 and 2 are relatively bulky and inefficient due to their large numbers of inductive windings and cores, and other circuits typically provided in ballasts such as preheat and ignition circuits add additional size and weight. Therefore a ballast that eliminates conventional analog ballast components would be highly desirable.

SUMMARY OF THE DISCLOSURE

Embodiments of the invention pertain to a ballast that uses a microcontroller to provide various control functionalities, including dimming.

In accordance with one preferred embodiment of the invention, a ballast for a gas discharge lamp includes a microcontroller that provides a pulse width modulated signal that controls the frequency of drive current supplied by a switching section to a lamp. The pulse width modulated signal is provided to a signal conditioner that produces a generating lamp current control signal having a voltage corresponding to a pulse width of a pulse width modulated signal. The lamp current control signal is provided to voltage controlled oscillator (VCO) control logic that also receives a lamp current feedback signal and generates a VCO control signal in response to the lamp current control signal and the lamp current feedback signal. The VCO control signal is received by a VCO that produces switching signals having frequencies corresponding to the voltage of the VCO control signal. The switching control signals are received by a switching section that generates an AC drive current having a frequency controlled by the switching signals.

The microcontroller may control the drive current frequency in response to an input signal to provide a dimming function. In a two-wire embodiment, the input signal may be supplied by a triac sensor such that it represent the power supplied by a triac to the ballast. In a three-wire embodiment, the input signal may be supplied by any of a variety of signal sources including a manual dimmer, a light monitor, a motion sensor, a remote control receiver, or a communication interface. The ballast may supply drive current to a single lamp or to multiple lamps.

In one preferred embodiment, the ballast is implemented in a ceiling fan to control one or more lamps of the ceiling fan. The ballast may be implemented in individual lamps of the ceiling fan, such as in lamps that are compatible with conventional incandescent bulb sockets. Alternatively the ballast may be implemented in the fan structure itself and drive one or more bulbs received in fluorescent bulb sockets. The ballast or ballasts may provide dimming of the ceiling fan lamps through the use of a manual dimmer, a dedicated or universal remote control, or other sources of input signals.

DETAILED DESCRIPTION OF PREFERRED EMBODIMENTS

Figure 1:
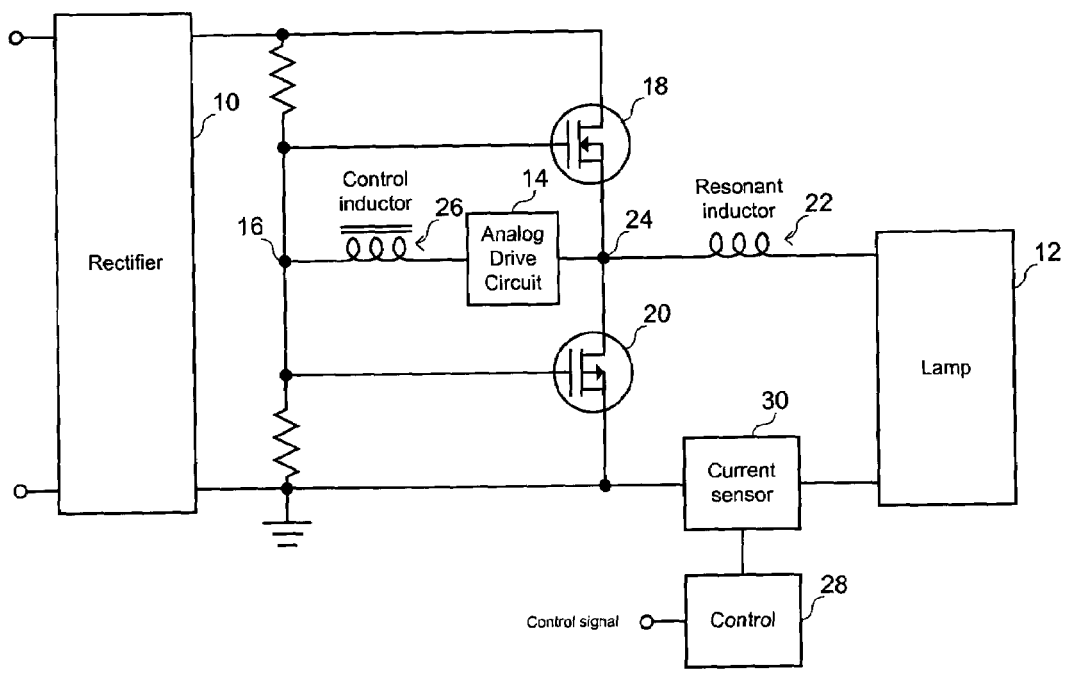
FIG. 1 shows a prior art three-wire analog dimming ballast.
Figure 2:
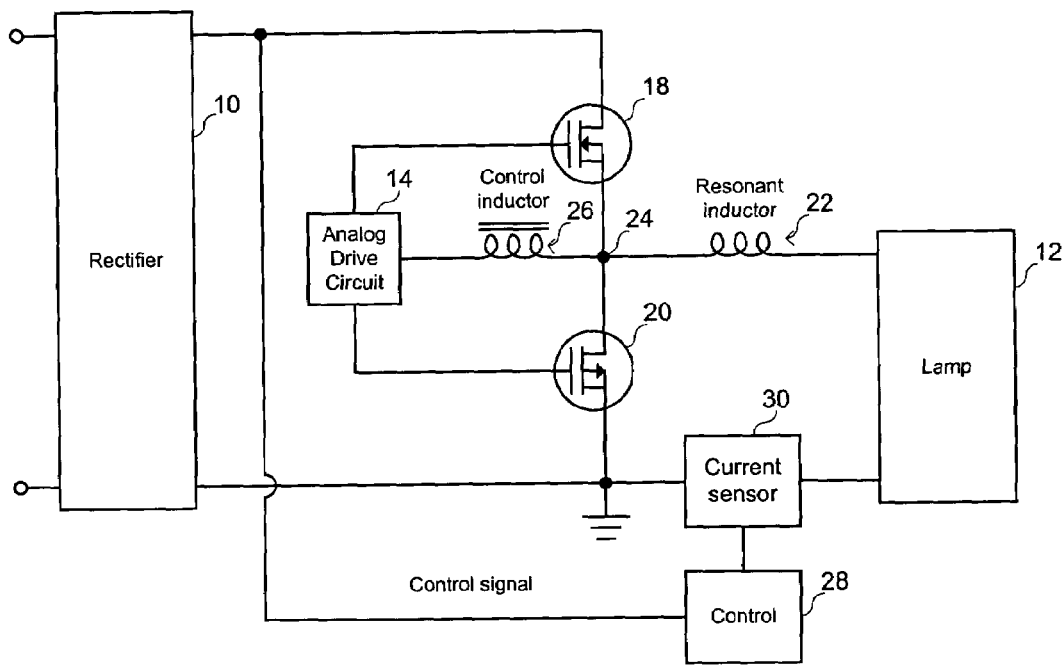
FIG. 2 shows a prior art two-wire analog dimming ballast.
Figure 3:
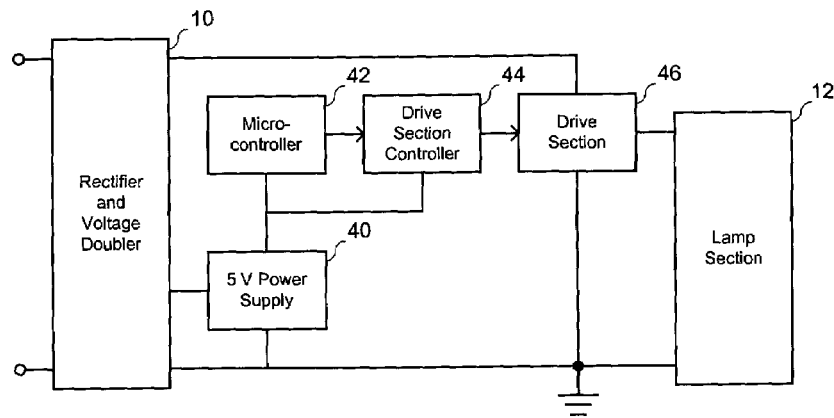
FIG. 3 shows a block-level schematic of a ballast incorporating a microcontroller in accordance with embodiments of the invention.

FIG. 3 shows a block-level schematic of a ballast incorporating a microcontroller in accordance with embodiments of the invention. The ballast includes a rectifier 10 for supplying a rail voltage and a 5 V power supply 40 for providing a DC supply voltage for active components of the ballast. A microcontroller 42 provides a control signal to a switching section controller 44, which in turn provides a control signal to a switching section 46 that supplies a switching signals to a lamp section 12. The control signal provided by the microcontroller 42 is generated in accordance with programming instructions executed by the microcontroller, allowing the microcontroller 42 to perform a wide range of control operations and provide a wide range of lamp functionalities. A variety of such control operations and lamp functionalities are discussed herein. Examples include preheating and ignition sequences, lamp current detection and regulation, bulb detection, dimming, ambient light sensing, motion detection, remote control, and networked control, among others.

Figure 4:
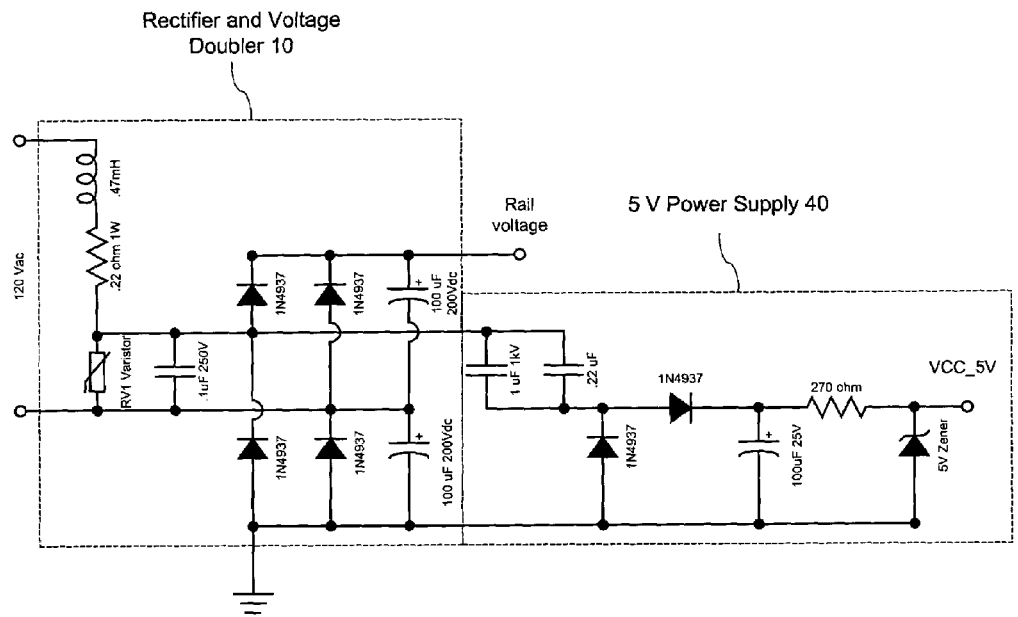
FIG. 4 shows a component level schematic of rectifier and power supply sections of an implementation in accordance with a first preferred embodiment.
Figure 5:
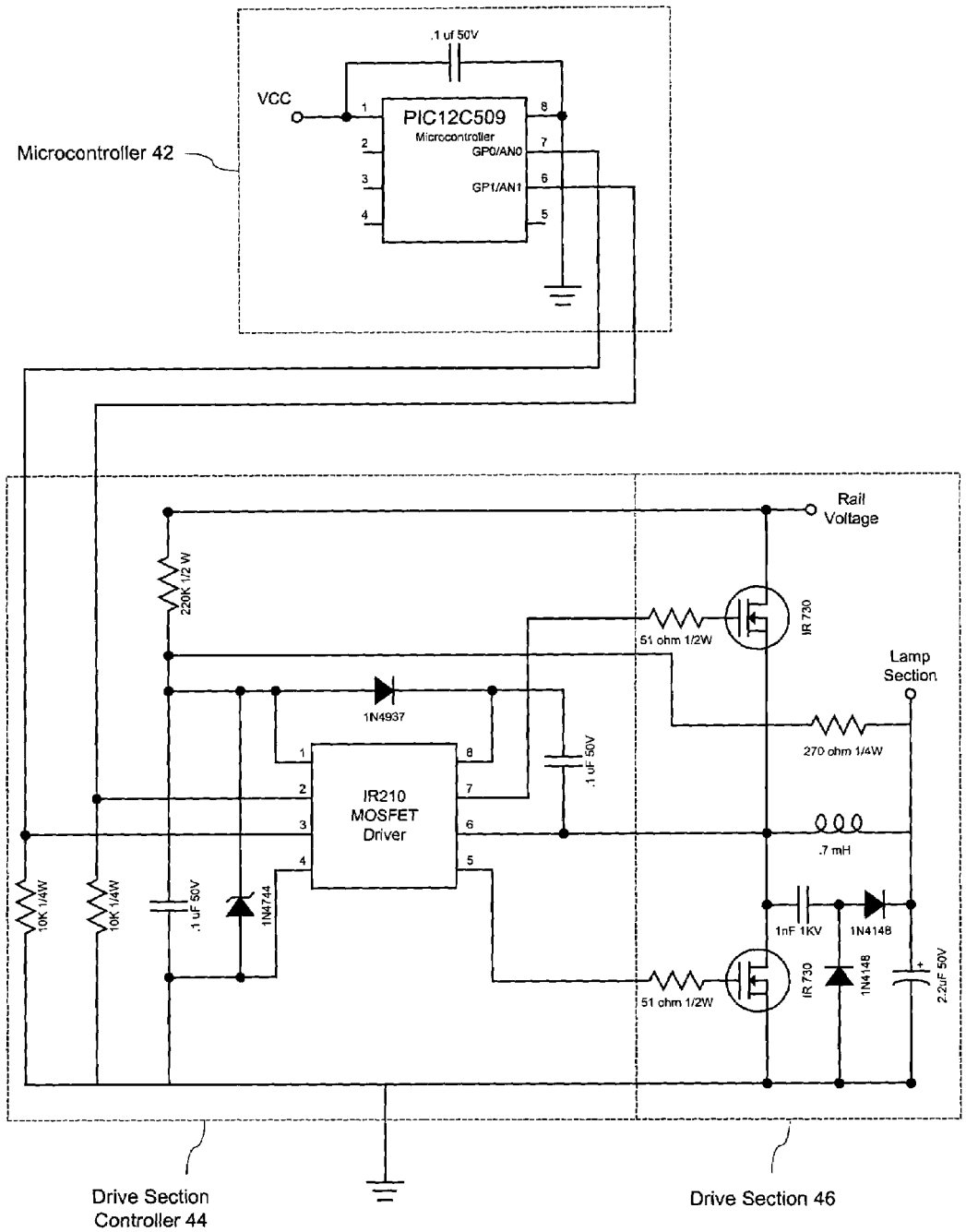
FIG. 5 shows a component-level schematic of a microcontroller, drive frequency generator and drive section of an implementation of the first preferred embodiment using a MOSFET driver in the drive frequency generator.

FIGS. 4 and 5 show component level schematics of an implementation of the blocks illustrated in FIG. 3 in accordance with a first preferred embodiment. FIG. 4 shows component-level schematics of the rectifier 10 and power supply 40. The rectifier 10 is implemented as a bridge rectifier that doubles the input AC line voltage and converts it to DC. The power supply 40 uses a zener diode to provide a 5 volt DC signal for driving integrated circuit components such as the microcontroller. FIG. 5 shows the microcontroller 42, switching section controller 44 and switching section 46. The microcontroller used in this implementation is a PIC12C509 supplied by Microchip Technology Inc. The microcontroller provides control signals to an IR2101 MOSFET driver, supplied by International Rectifier Corp. The MOSFET driver supplies switching signals to gates of MOSFETs in the switching section, which in turn supply AC drive current to the lamp section.

Figure 6:
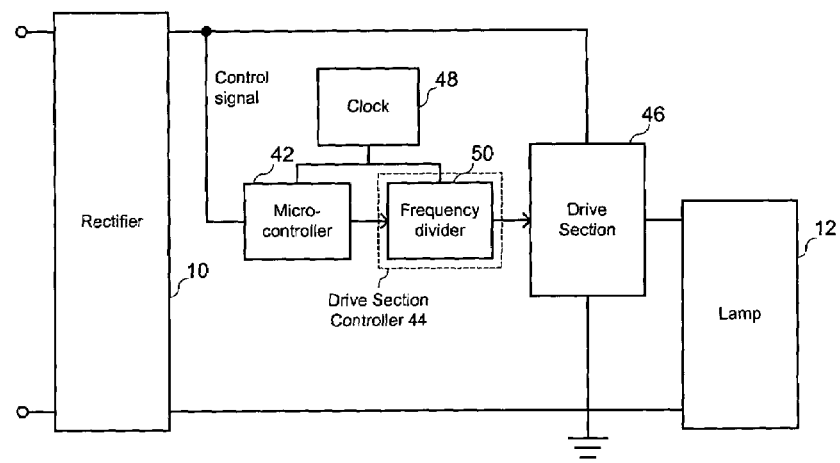
FIG. 6 shows a block-level schematic of a dimmable ballast incorporating a microcontroller and using a frequency divider in the drive section controller in accordance with a second preferred embodiment.

FIG. 6 shows a block-level schematic of a second preferred embodiment in which switching signals are provided to the switching section 46 by a frequency divider of the switching section controller 44, enabling the ballast to provide a dimming function by changing the switching frequency of the switching section 46. As shown in FIG. 6, the microcontroller 42 receives a control signal in response to which the microcontroller 42 controls the output frequency of a frequency divider 50. The frequency divider 50 sets its divisor value in response to the control signal received from the microcontroller 42, and applies the divisor to a clock signal from a clock 48 to produce a switching signal that is supplied to the switching section 46. Thus a dimming function may be provided by varying the control signal to vary the drive signal frequency.

The inventors have found that the dimming performance of the embodiment of FIG. 6 is limited. Experiments have revealed that dimming provided by the circuit of FIG. 6 is highly dependent on the impedance of the lamp section, which include both the non-linear impedance of the lamp itself and the impedance of inductors typically provided in series with the lamp. For example, it was observed that in a circuit using a drive frequency of 40 kHz for normal operation, an increase in the drive frequency to 62 kHz is required to produce perceptible dimming, yet an increase of the drive frequency to 66 kHz dims the lamp completely. Therefore precise frequency adjustments within a small frequency range are required to provide meaningful dimming control. Such precision is difficult to achieve using a frequency divider, since the frequency divider is limited to producing output frequencies that are the result of division of the clock frequency by a whole number divisor. For example, given a clock frequency of 2 MHz, there are only three frequencies within the range of 62 kHz to 66 kHz that can be produced by dividing 2 MHz by a whole number. Even if the clock frequency and circuit parameters such as inductance and capacitance values are adjusted to give a wider frequency range for dimming, the dimming is still perceived as occurring in a series of discrete steps, rather than in the continuous manner expected by consumers based on their experience with dimmable incandescent lamps.

Figure 7:
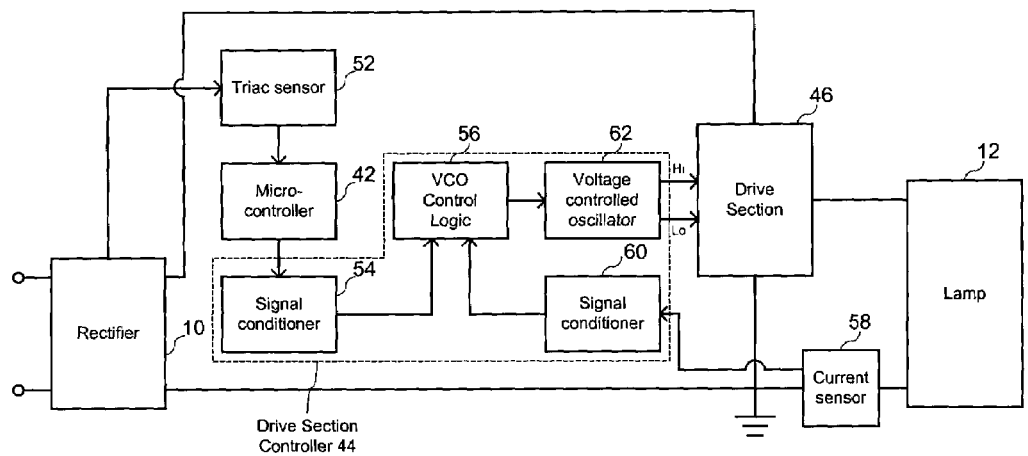
FIG. 7 shows a block-level schematic of a dimmable two-wire ballast incorporating a microcontroller and using a voltage controlled oscillator in accordance with a third preferred embodiment.
Figure 8:
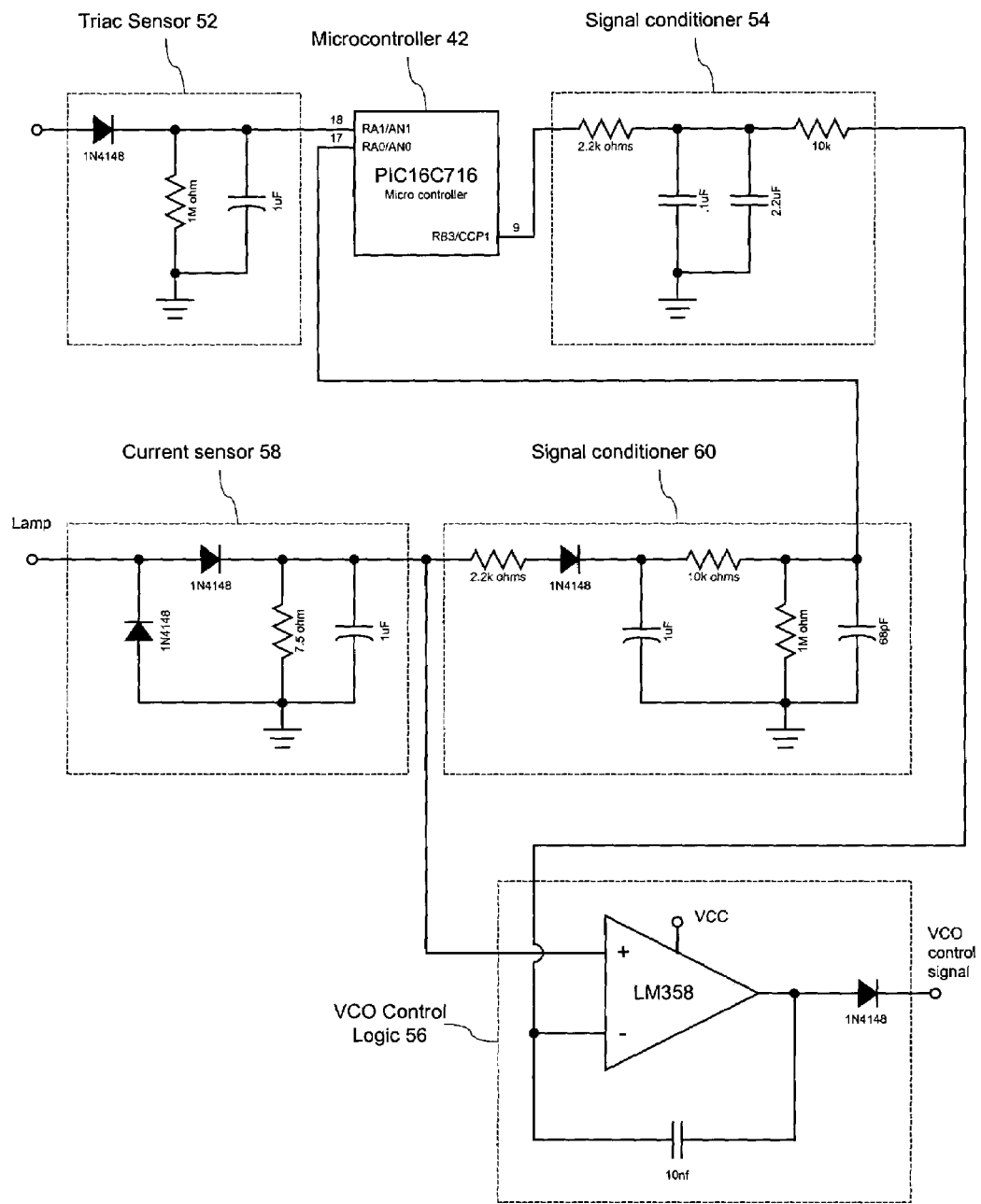
FIG. 8 shows a component-level schematic of a triac sensor, current sensor, signal conditioners and control section of an implementation of the third preferred embodiment.

FIG. 7 shows a block-level schematic of a dimmable two-wire ballast incorporating a microcontroller and using a voltage controlled oscillator (VCO) in the drive section controller 44 in accordance with a third preferred embodiment. In this embodiment, a triac sensor 52 receives an input voltage from the rectifier 10 that represents the power supplied to the rectifier 10 by a triac dimmer. The triac sensor 52 is comprised of filtering and signal conditioning elements that derive a DC signal having a voltage that is a function of the rms power supplied by the triac. The signal from the triac sensor 52 is passed to an input of a microcontroller 42. The microcontroller 42 in turn generates a control signal in the form of a pulse width modulated signal comprised of pulses that are produced at a predetermined period and that have a width that is proportional to the voltage of the triac sensor 52 output signal. The pulse width modulated signal is passed through a signal conditioner 54 to produce a DC voltage that is proportional to the pulse width. This DC voltage is provided to VCO control logic 56 as a lamp current control signal. The VCO control logic 56 also receives a lamp current feedback signal that is derived from the AC lamp current by a lamp current sensor 58. The signal from the lamp current sensor 58 is processed by a signal conditioner 60 before being supplied to the VCO control logic 56.

The VCO control logic 56 generates a VCO control signal in response to the lamp current control signal and the lamp current feedback signal. The VCO control signal is supplied to a VCO 62, causing the VCO 62 to produce switching signals having a frequency corresponding to the VCO control signal. The switching signals are provided to the switching section 46 to control the frequency of the AC drive current supplied to the lamp section. The use of the VCO to provide switching signals enables the lamp current frequency to be precisely controlled over a wide frequency range in an essentially continuous manner rather than in the stepped manner of the previous embodiment. Thus the lamp current frequency may be increased or decreased in a smooth manner to smoothly dim or brighten the lamp.

Figure 9:
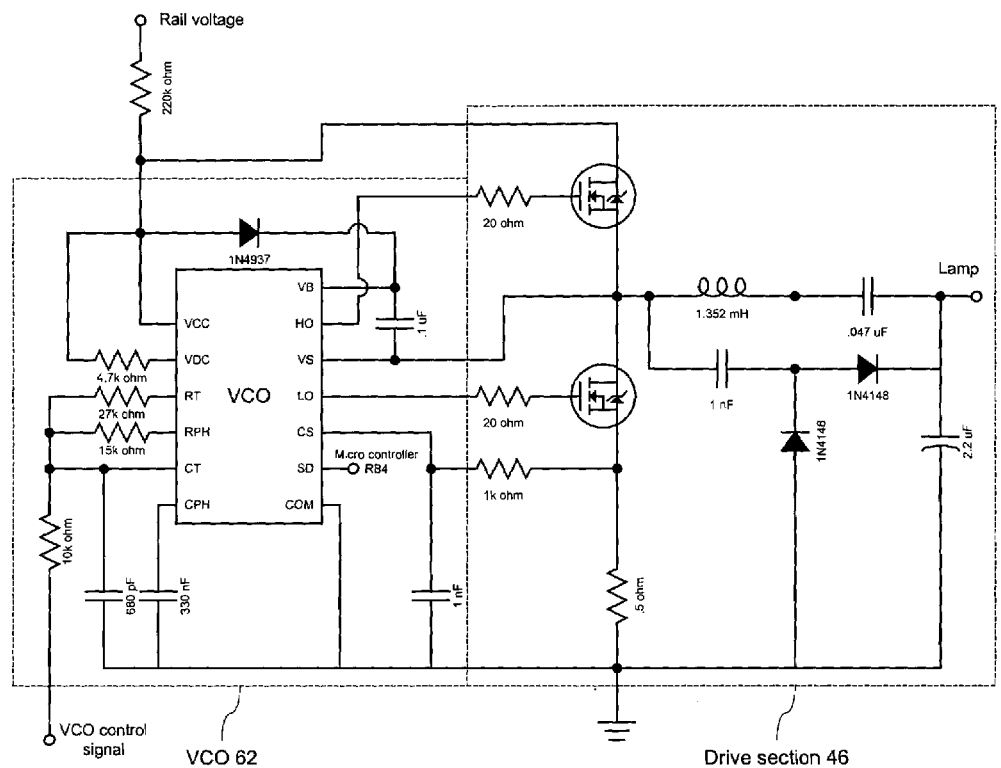
FIG. 9 shows a component-level schematic of a VCO section and drive section of an implementation of the third preferred embodiment.
Figure 10:
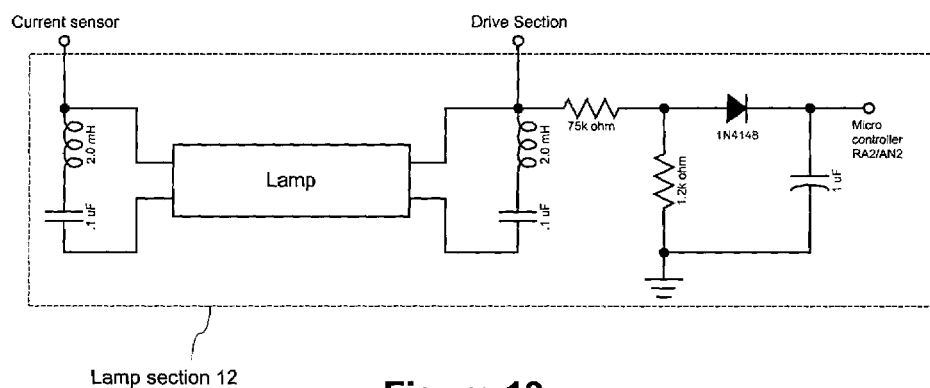
FIG. 10 shows a component-level schematic of a lamp section of an implementation of the third preferred embodiment.
Figure 11:
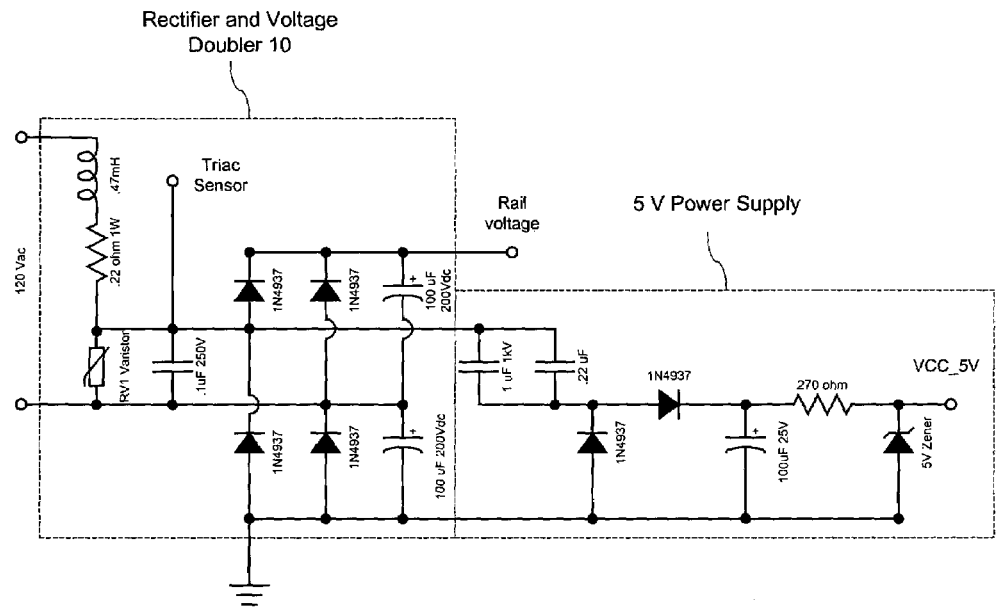
FIG. 11 shows a component level schematic of rectifier and power supply sections of an implementation of the third preferred embodiment.

Component-level schematics for sections of the third preferred embodiment of FIG. 7 are provided in FIGS. 8–11. Individual components that form the triac sensor 52, microcontroller 42, signal conditioner 54, lamp current sensor 58, lamp current signal conditioner 60 and VCO control logic 56 are shown in FIG. 5. The microcontroller 42 used in this implementation is a PIC16C716 supplied by Microchip Technology Inc. The VCO control logic 56 is implemented using an LM358 op amp supplied by National Semiconductor Corp. The op amp is configured as an integrator and receives signals from the signal conditioners 54, 60 at differential inputs to generate the VCO control signal. As shown in FIG. 9, the VCO control signal is provided as a control input to the VCO, which generates high and low outputs at a frequency corresponding to the input voltage. The high and low outputs are supplied as respective switching signals to the gates of MOSFET switches in the switching section 46, which modulate the rail voltage to generate an AC drive current in the inductor coupled to their common node at the frequency determined by the frequencies of the switching signals. The inductor is mutually coupled to inductors provided as coupling elements in the lamp section 12 shown in FIG. 10. Components of the rectifier of FIG. 7 are shown in FIG. 11. Also shown is a 5 V power supply, not shown in FIG. 7, which supplies power for active components such as the microcontroller 42, VCO control logic 56, and VCO 62. The rectifier 10 and power supply of FIG. 11 are substantially the same as those shown in FIG. 4.

Figure 12:
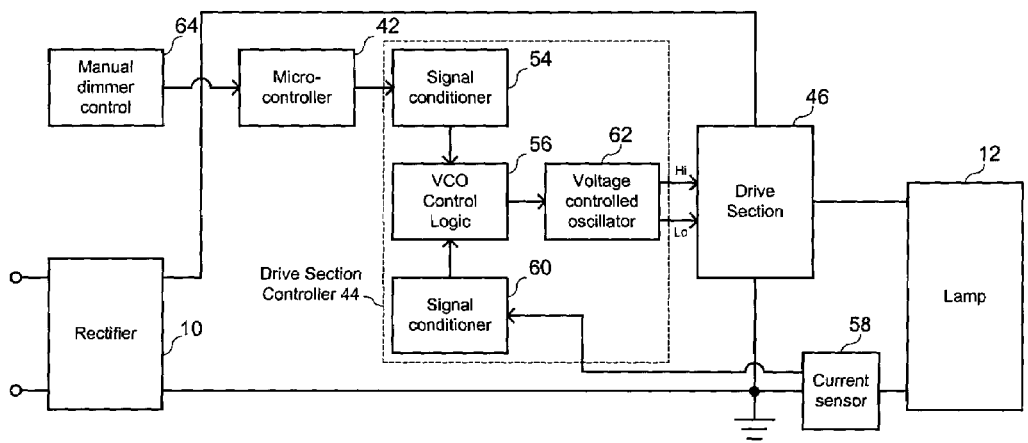
FIG. 12 shows a block-level schematic of a dimmable three-wire ballast incorporating a microcontroller in accordance with a fourth preferred embodiment.
Figure 13:
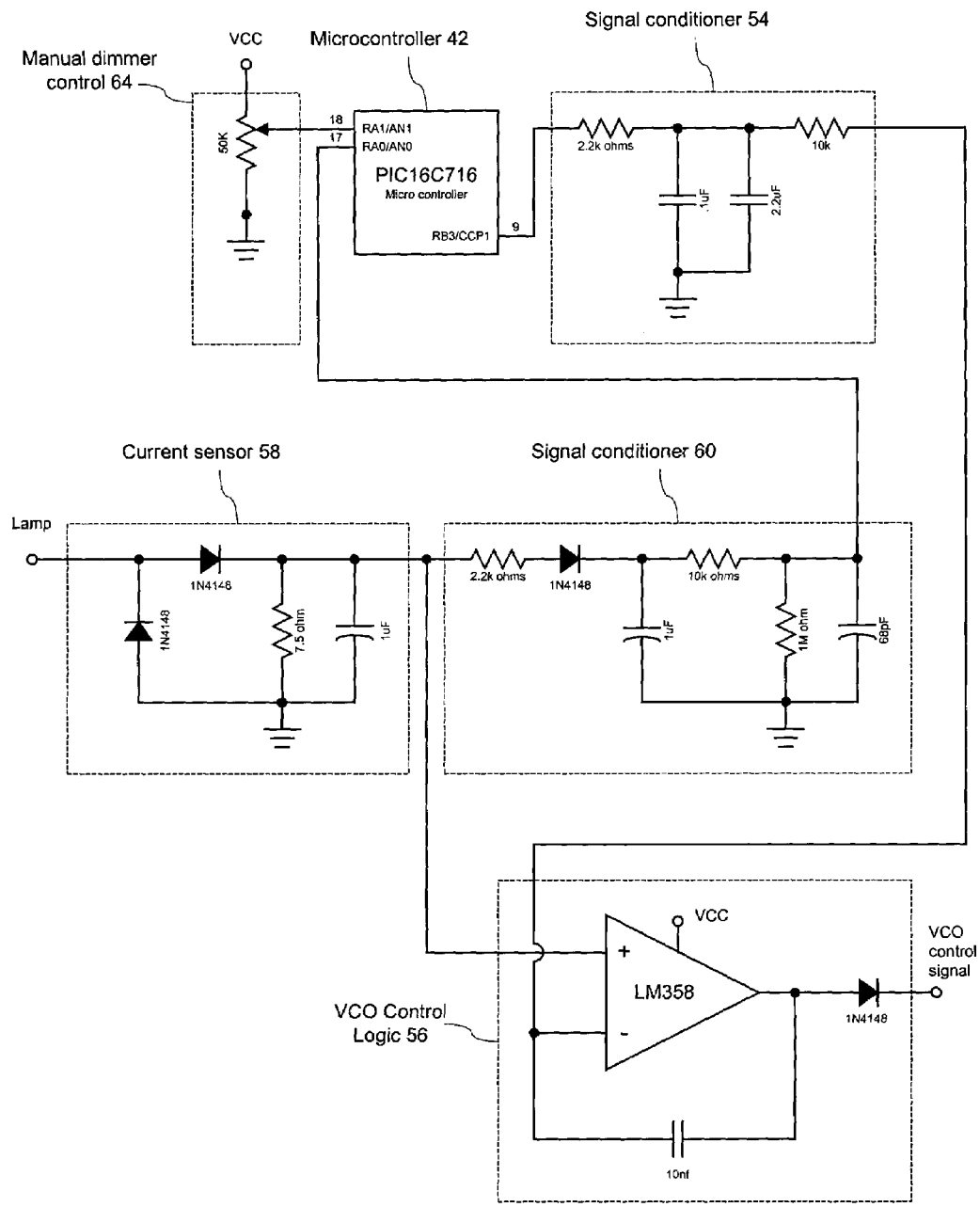
FIG. 13 shows a component-level schematic of a user control signal generator, current sensor, signal conditioners and control section of an implementation of the fourth preferred embodiment.
Figure 14:
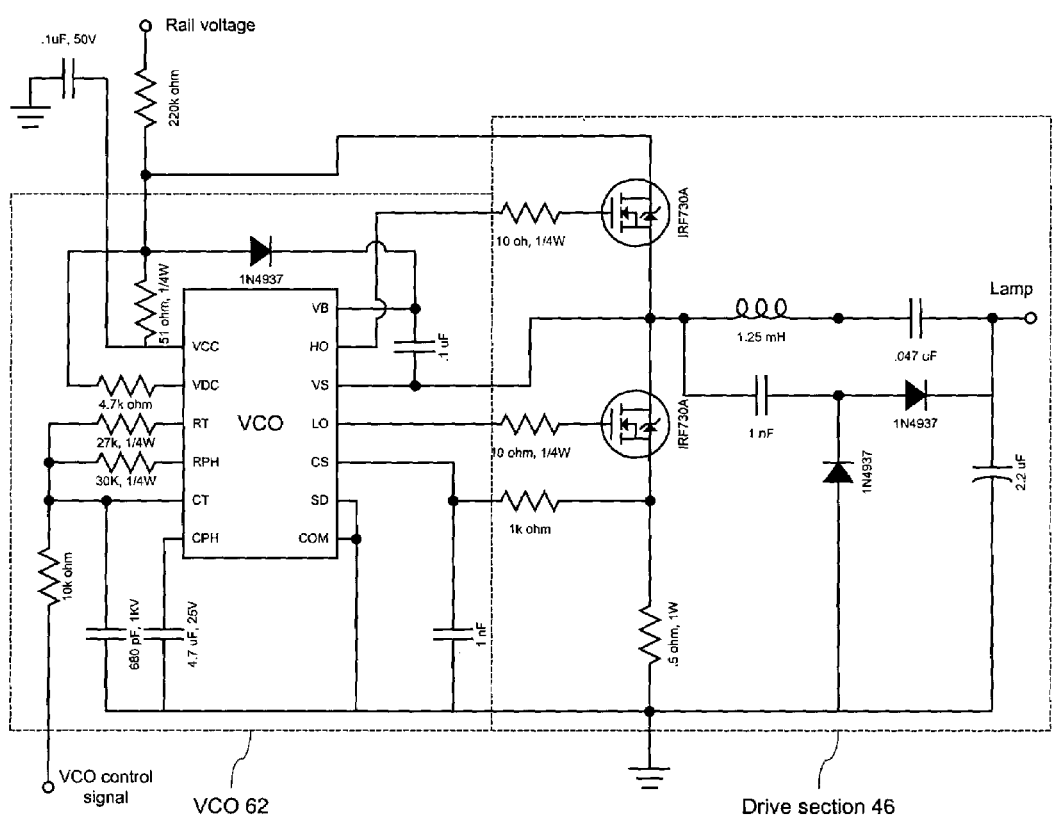
FIG. 14 shows a component-level schematic of a VCO section and drive section of an implementation of the fourth preferred embodiment.

FIG. 12 shows a block-level schematic of a dimmable three-wire ballast incorporating a microcontroller and using a voltage controlled oscillator (VCO) in the switching section controller 44 in accordance with a fourth preferred embodiment. This embodiment is similar to the third preferred embodiment, but differs in that a manual dimming control is used to supply a dimming control signal to the microprocessor that is independent of the line voltage that drives the rectifier 10. Thus, as seen in FIG. 12, a manual dimmer control 64 is essentially substituted for the triac sensor of the third preferred embodiment. However, in alternative embodiments, another dimming control signal source may be used. For example, the dimming signal may be received from a remote control receiver or a communication interface, or from another device into which the ballast is incorporated, such as a ceiling fan as described below. FIGS. 13–14 show component level schematics of an implementation of the third preferred embodiment. In this implementation the manual dimmer control 64 is implemented as a potentiometer. The microcontroller 42, current sensor 58, signal conditioners 54, 60 and the VCO control logic 56 are essentially the same as in the third preferred embodiment, as are the rectifier 10, power supply and lamp section 12. The VCO 62 and switching section 46 of FIG. 4 are essentially the same as those of the third preferred embodiment (FIG. 9), although some component values are different.

In operation, a ballast in accordance with the third and fourth preferred embodiments performs a continuous feedback process that adjusts the lamp current frequency that is set by the VCO in accordance with a signal indicating an amount of dimming to be provided. The use of a VCO to control the lamp current frequency provides precise control over lamp current and thus over dimming.

Figure 15:
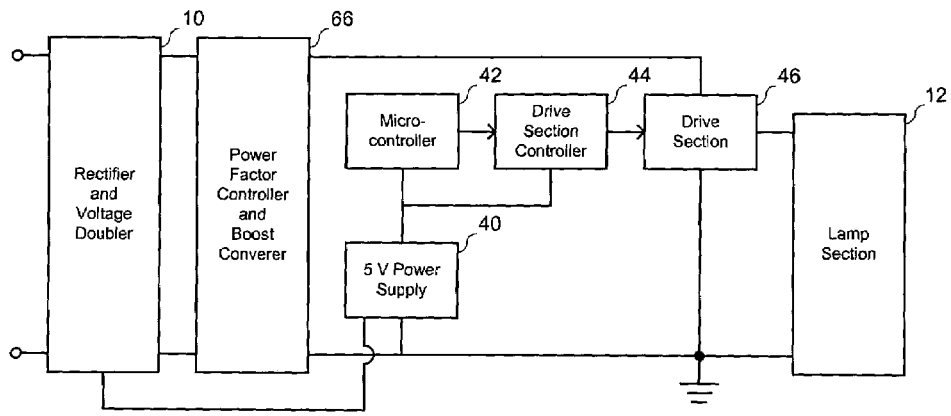
FIG. 15 shows a block-level schematic of a ballast incorporating a microcontroller and a power factor controller in accordance with a fifth preferred embodiment.
Figure 16:
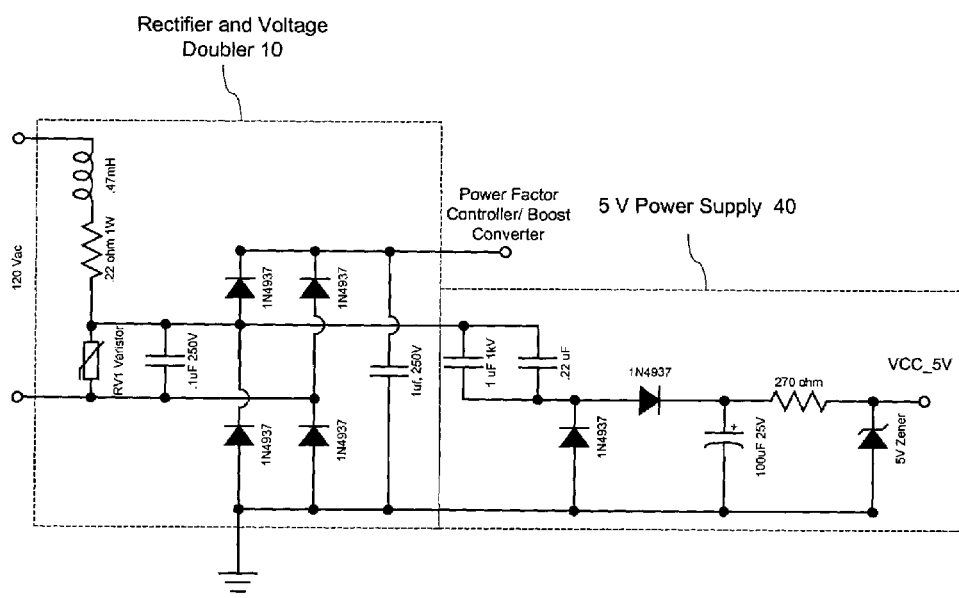
FIG. 16 shows a component level schematic of rectifier and power supply sections of an implementation of the fifth preferred embodiment.
Figure 17:
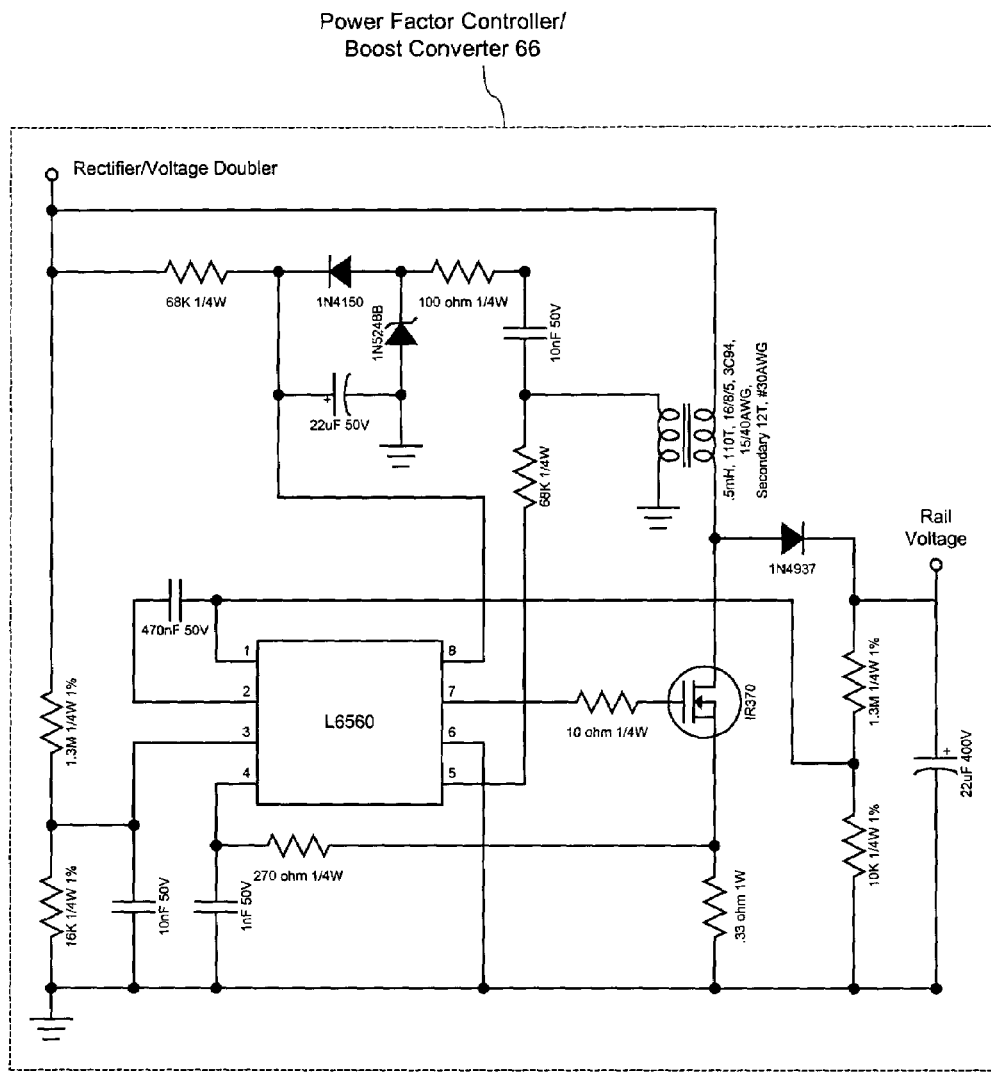
FIG. 17 shows a component level schematic of a power factor controller section of an implementation of the fifth preferred embodiment.

FIG. 15 shows a block-level schematic of a ballast incorporating a microcontroller and a power factor controller in accordance with a fifth preferred embodiment. In this embodiment, a power factor controller/boost converter 66 supplies the rail voltage to the drive section 46. The power factor controller/boost converter provides power factor correction for the drive current supplied to the drive section. As seen in FIG. 16, the rectifier 10 and power supply 40 of an implementation of this embodiment are similar to those of the first preferred embodiment, with minor changes of components. An implementation of the power factor controller/boost converter of this embodiment is shown in FIG. 17. This implementation uses an L6560 power factor controller supplied by SGS-Thomson Microelectronics Corp.

Figure 18:
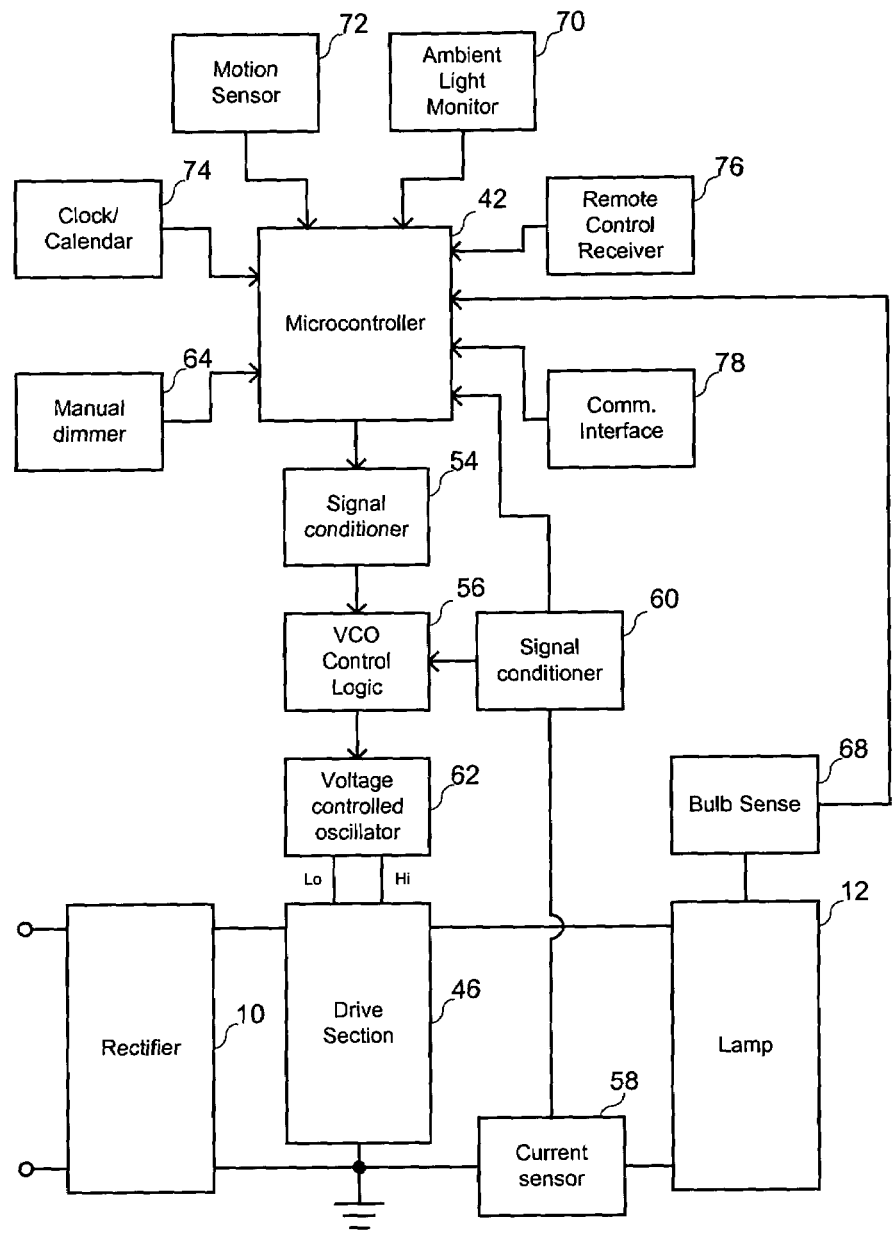
FIG. 18 shows a block-level schematic of a dimmable ballast incorporating a microcontroller and a variety of data sources used by the microcontroller for lamp control in accordance with a sixth preferred embodiment.

FIG. 18 shows a block-level schematic of a dimmable ballast incorporating a microcontroller and a variety of data sources that may be used by the microcontroller as sources of signals for lamp control in accordance with a sixth preferred embodiment. In this embodiment, the microcontroller is programmed to perform processing that controls the lamp or takes other actions in response to data received from one or more of the data sources.

One of the data sources that may be used by the microcontroller 42 is a bulb sense circuit 68 that provides a signal representative of the presence or absence of a bulb in the lamp socket. Based on the presence or absence of the bulb as represented by the bulb sense signal, the microcontroller 42 may perform processing such as terminating power to the lamp section to prevent the possibility of electric shock.

A further data source that may be used by the microcontroller 42 is the signal conditioner 60 that supplies a signal representing lamp current as detected by the current sensor 58. The lamp current signal may be used for detecting bulb conditions such as current overload and filament damage.

The microcontroller 42 may also receive a signal from an ambient light monitor 70. For example, an ambient light monitor 70 implemented as a photodetector may be employed to provide a signal representing the amount of light in the room or area where the lamp is deployed. Based on the detected light level, the microcontroller may perform processing to provide automated on/off lamp control. In embodiments that provide dimming, the microcontroller may also perform processing to maintain a desired light level by providing controlled brightening and dimming of the lamp in response to the total ambient light level. Thus, for example, the brightness of a lamp may be gradually increased and decreased as natural light changes throughout the day.

The microcontroller may similarly receive a signal from a motion detector 72. Based on the motion detector signal, the microcontroller may perform processing to control the lamp on/off state or brightness based on detected motion. Such processing may also take into account the signals from other data sources such as the ambient light monitor 70. For example, based on signals from the ambient light monitor 70 and the motion sensor 72, the microcontroller may perform processing that causes the lamp to illuminate an area to a desired total ambient light level when motion is detected by the motion sensor.

The microcontroller may also receive a signal from a clock/calendar unit 74 that indicates the time and/or date, allowing the microcontroller to perform processing to provide lamp control in accordance with a predetermined schedule or a user-specified schedule. For example, the microcontroller may control the lamp to turn on and off or to be adjusted to various brightness levels in accordance with predefined or user-defined schedules.

Another data source for the microcontroller may be a remote control receiver 76. The remote control receiver 76 may receive remote control signals generated by a remote control device. Such signals may take the form of instructions that are executed by the microcontroller to perform processing such as turning on and off the lamp, dimming or brightening the lamp, turning on or off environmental detectors such as ambient light monitors or motion sensors, or creating or modifying a schedule for automated control such as automatic on/off and automatic dimming. A variety of technologies such as infrared and RF technologies may be for transmitting and receiving the remote control signals. The user's remote control device may be implemented as a dedicated remote control unit for controlling the lamp or the lamp and other devices, or as a universal remote control that is programmable to control one or multiple devices.

The microcontroller 42 may also receive data from a communication interface 78. The communication interface 78 preferably provides communication in accordance with a widely-used communication protocol that enables other devices to communicate with the microcontroller 42. Example of communication interfaces that may be employed include wireless network interfaces such as interfaces compatible with the BlueTooth wireless personal network standard, as well as physical medium-based communication interfaces such as Ethernet interfaces. The incorporation of a communication interface 78 as a data source for the microcontroller enables the microcontroller to be programmed to perform processing for providing a broad range of functionalities. For example, data received through the communication interface may supply remote control commands from a remote device such as a home network server. Such commands may be used by an application running on such a server to control the operation of the lamp in an automated fashion, or to provide direct control over the lamp by the user at a remote location, such as from a remote terminal through the internet.

While the ballasts of the aforementioned preferred embodiments are shown as controlling single lamps, in further embodiments a single ballast may control multiple lamps. For example, the non-dimmable first preferred embodiment of FIG. 3 may be adapted to supply drive current to multiple lamp sections 12. This adaptation may be achieved by connecting multiple lamps or lamp sections 12 in parallel to the switching section 46. Alternatively, a separate switching section 46 may be provided for each respective lamp section 12 so as to avoid overloading the MOSFETs of the switching section 46. Dimmable embodiments such as the third, fourth and sixth embodiments may also be adapted to supply drive current to multiple lamps or lamp sections 12 by connecting multiple lamps or lamp sections in parallel to a single switching section 46, or by providing a separate switching sections 46 for each respective lamp section 12. Where a separate switching section is provided for each lamp section 12, it may be desirable to also provide current sensors and signal conditioners for each individual lamp section 12, and to add the resulting signals before providing them to the VCO control logic 56. However, since the separate switching sections receive the same switching signals from the VCO and thus produce similar drive currents and hence similar brightness levels (assuming similar drive section and bulb section components are used), a simpler implementation may be achieved by providing the lamp current feedback signal from a single lamp section to the VCO control logic 56.

One preferred application of ballasts in accordance with the aforementioned preferred embodiments is in compact fluorescent lamps that are compatible with incandescent lamp fixtures and voltages. The small size of these ballasts allow them to be incorporated into small packages that can be scaled to fit in spaces designed for conventional incandescent lamps. Two-wire dimmable ballasts in accordance with embodiments of the invention also provide the benefit of being dimmable using power supplied from conventional triac dimmers.

Another preferred application of ballasts in accordance with the aforementioned preferred embodiments is in ceiling fans. Ceiling fans are generally comprised of a ceiling-mountable housing that includes a fan motor coupled to a plurality of fan blades, and one or more light fixtures. It is highly desirable to facilitate the use of fluorescent lamps in ceiling fans, however the size and bulk of conventional fluorescent lamps and the lack of features such as dimming that are conventional for incandescent lamps has made practical uses of fluorescent lamps in ceiling fans difficult to achieve. The aforementioned preferred embodiments are ideal for use in ceiling fans due to their small size and weight, their ability to provide advanced features such as dimming and remote control, and their ability to drive multiple lamps from a single small ballast. For example, in accordance with one preferred application, a residential ceiling fan includes a ballast such as one of the aforementioned preferred embodiments. The ceiling fan motor and the ballast operate from a single line voltage supplied by residential electrical service. The ballast includes a microcontroller that controls a switching section controller, which may for example be implemented using a MOSFET driver as in the first preferred embodiment, or using a voltage controlled oscillator with lamp current feedback for dimming as in the third, fourth and sixth preferred embodiments. The ballast may drive one or more lamps, and may drive the lamps using a single or multiple drive sections.

The ballast incorporated into the ceiling fan may provide dimming functions through the use of a VCO as described above, and preferably uses a three-wire system such as that of the fourth preferred embodiment. The dimming control signal may be supplied through a manual control such as a potentiometer, or may be received by a remote control receiver from a dedicated or universal remote control that produces signals representing commands directed to the lamp or to the fan. The dimming control signal may also be supplied by a control device of the fan itself in response to receipt of control signals by the fan such as from a remote control. Other control signals may also be supplied to the ballast by remote control such as on/off signals and signals for programming the operation of the lamp. The ballast may also be programmable, for example, to dim or turn the lamps on/off in accordance with a specified schedule. While a ceiling fan implementation of a ballast utilizing a remote control is presently preferred, other implementation may use additional or alternative means for providing signals to the ballast microcontroller, such network communication interfaces.

One desirable feature of ceiling fan implementations is small bulb size, since in some fans there is relatively little clearance between the bulb sockets and the fan blades. In such implementations, it is preferred to utilize the fluorescent bulb structure described in applicants' U.S. Pat. No. 6,634,820, the entirety of which is incorporated herein by reference for its teachings regarding compact bulb structures. The structure described in that patent is a fluorescent bulb housing that is adapted for use in standard incandescent light bulb sockets. The structure utilizes a flat base portion that provides significant space for housing ballast components, and that also provides a relatively short bulb that is appropriate for use in ceiling fan applications.

The features described above are not exclusive of other features and variations. While the embodiments illustrated in the figures and described above are presently preferred, these embodiments are offered by way of example only. The invention is not limited to a particular embodiment, but extends to various modifications, combinations, and permutations that fall within the scope of the inventions as claimed and their equivalents.

What is claimed is:

1. A ballast for a gas discharge lamp comprising: a switching section generating an AC drive current for driving a gas discharge lamp; a voltage controlled oscillator (VCO) supplying switching signals to the switching section to control the switching frequency of the switching section; a VCO control logic circuit supplying a VCO control signal to the VCO to control the frequencies of the switching signals supplied by the VCO in response to a lamp current feedback signal and a lamp current control signal; a signal conditioner generating said lamp current control signal such that the lamp current control signal has a voltage corresponding to a pulse width of a pulse width modulated signal received by the signal conditioner; and a microcontroller providing said pulse width modulated signal to the VCO control logic circuit, wherein the microcontroller controls the pulse width of the pulse width modulated signal to control the drive current supplied by the switching section and wherein the microcontroller controls dimming of a lamp coupled to the ballast by producing a pulse width modulated signal that increases the frequencies of the VCO switching signals to dim the lamp and produces a pulse width modulated signal that decreases the frequencies of the VCO switching signals to brighten the lamp.

2. The ballast claimed in claim 1, wherein the microcontroller controls dimming of the lamp in response to an input signal received by the microcontroller.

3. The ballast claimed in claim 2, wherein the input signal received by the microcontroller is provided by a triac sensor and represents the output of a triac that supplies power to the ballast.

4. The ballast claimed in claim 2, wherein the input signal received by the microcontroller is a signal generated by a manual dimmer control.

5. The ballast claimed in claim 2, wherein the input signal received by the microcontroller is a signal generated by a remote control receiver.

6. The ballast claimed in claim 2, wherein the input signal received by the microcontroller is a signal generated by a light monitor.

7. The ballast claimed in claim 2, wherein the input signal received by the microcontroller is a signal generated by a motion sensor.

8. The ballast claimed in claim 2, wherein the input signal received by the microcontroller is a signal generated by a communication interface.

9. The ballast claimed in claim 1, wherein the VCO control logic comprises a differential amplifier that receives the lamp current control signal and the lamp current feedback signal as inputs.

10. The ballast claimed in claim 1, wherein the switching section comprises a pair of MOSFETs connected between a rail voltage and a common voltage to generate said AC drive current at their common node, and wherein said VCO supplies said switching signals to respective gates of the MOSFETs.

11. A dimmable fluorescent lamp comprising: a ballast comprising: a switching section generating an AC drive current for driving a gas discharge lamp; a voltage controlled oscillator (VCO) supplying switching signals to the switching section to control the switching frequency of the switching section; VCO control logic supplying a VCO control signal to the VCO to control the frequencies of the switching signals supplied by the VCO in response to a lamp current feedback signal and a lamp current control signal; a signal conditioner generating said lamp current control signal such that the lamp current control signal has a voltage corresponding to a pulse width of a pulse width modulated signal received by the signal conditioner; and a microcontroller providing said pulse width modulated signal to the VCO control logic circuit, wherein the microcontroller controls the pulse width of the pulse width modulated signal to control the drive current supplied by the switching section, and a lamp section coupled to the switching section to be driven by the AC drive current and wherein the microcontroller controls dimming of the lamp coupled to the ballast by producing a pulse width modulated signal that increases the frequencies of the VCO switching signals to dim the lamp and produces a pulse width modulated signal that decreases the frequencies of the VCO switching signals to brighten the lamp.

12. The lamp claimed in claim 11, wherein the microcontroller controls dimming of the lamp in response to an input signal received by the microcontroller.

13. The lamp claimed in claim 12, wherein the input signal received by the microcontroller is provided by a triac sensor and represents the output of a triac that supplies power to the ballast.

14. The lamp claimed in claim 12, wherein the input signal received by the microcontroller is a signal generated by a manual dimmer control.

15. The lamp claimed in claim 12, wherein the input signal received by the microcontroller is a signal generated by a remote control receiver.

16. The lamp claimed in claim 12, wherein the input signal received by the microcontroller is a signal generated by a light monitor.

17. The lamp claimed in claim 12, wherein the input signal received by the microcontroller is a signal generated by a motion sensor.

18. The lamp claimed in claim 12, wherein the input signal received by the microcontroller is a signal generated by a communication interface.

19. The lamp claimed in claim 11, wherein the VCO control logic comprises a differential amplifier that receives the lamp current control signal and the lamp current feedback signal as inputs.

20. The lamp claimed in claim 11, wherein the switching section comprises a pair of MOSFETs connected between a rail voltage and a common voltage to generate said AC drive current at their common node, and wherein said VCO supplies said switching signals to respective gates of the MOSFETs.

21. A method of driving a gas discharge lamp, comprising: generating a pulse width modulated signal at a microcontroller; generating a lamp current control signal having a voltage corresponding to the pulse width of the pulse width control signal; supplying the lamp current control signal and a lamp current feedback signal to a voltage controlled oscillator (VCO) control logic to generated a VCO control signal; supplying the VCO control signal to a VCO to generate switching control signals; and supplying the switching control signals to a switching section control the frequency of an AC drive current supplied by the switching section to the lamp wherein the pulse width of the pulse width modulated signal is determined by the microprocessor in accordance with an input signal received by the microcontroller.

22. The method claimed in claim 21, wherein the input signal received by the microcontroller is a signal generated by a manual dimmer control.

23. The method claimed in claim 21, wherein the input signal received by the microcontroller is a signal generated by a remote control receiver.

24. The method claimed in claim 21, wherein the input signal received by the microcontroller is a signal generated by a light monitor.

25. The method claimed in claim 21, wherein the input signal received by the microcontroller is a signal generated by a motion sensor.

26. The method claimed in claim 21, wherein the input signal received by the microcontroller is a signal generated by a communication interface.

27. A method of driving a gas discharge lamp, comprising: generating a pulse width modulated signal at a microcontroller; generating a lamp current control signal having a voltage corresponding to the pulse width of the pulse width control signal; supplying the lamp current control signal and a lamp current feedback signal to a voltage controlled oscillator (VCO) control logic to generated a VCO control signal; supplying the VCO control signal to a VCO to generate switching control signals; and supplying the switching control signals to a switching section control the frequency of an AC drive current supplied by the switching section to the lamp wherein the pulse width of the pulse width modulated signal is determined by the microprocessor in accordance with an input signal representing the output power of a triac supplying power to the lamp.

* * * * *